(12) United States Patent
Nowarre et al.

(10) Patent No.: US 11,117,645 B2
(45) Date of Patent: Sep. 14, 2021

(54) CARGO HOLD COMPONENT SYSTEM FOR CONVERTIBLE CARGO HOLD

(71) Applicant: Airbus Operations GmbH, Hamburg (DE)

(72) Inventors: Sascha Nowarre, Hamburg (DE); Sven Scherenberger, Hamburg (DE); Stephan Kahle, Hamburg (DE); Rasmus Behrens, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 666 days.

(21) Appl. No.: 15/949,727

(22) Filed: Apr. 10, 2018

(65) Prior Publication Data

US 2018/0290724 A1 Oct. 11, 2018

(30) Foreign Application Priority Data

Apr. 11, 2017 (DE) ..................... 10 2017 206 186.3

(51) Int. Cl.
*B64C 1/20* (2006.01)
*B64D 9/00* (2006.01)
(Continued)

(52) U.S. Cl.
CPC ............... *B64C 1/20* (2013.01); *B64D 9/003* (2013.01); *B65G 13/11* (2013.01); *B65G 39/09* (2013.01);
(Continued)

(58) Field of Classification Search
CPC ......... B64C 1/20; B64C 2211/00; B64C 1/22; B64C 1/24; B64D 9/003; B64D 2009/006; B65G 13/11; B65G 39/09; Y02T 50/40
See application file for complete search history.

(56) References Cited

U.S. PATENT DOCUMENTS

| 4,349,302 A | * | 9/1982 | Ferguson, Jr. | ......... B64D 9/003 |
| | | | | 410/46 |
| 6,193,043 B1 | * | 2/2001 | Langston | ............... B65G 13/11 |
| | | | | 193/35 SS |

(Continued)

FOREIGN PATENT DOCUMENTS

| DE | 10319503 B4 | 11/2004 |
| DE | 10319504 B4 | 11/2004 |

(Continued)

OTHER PUBLICATIONS

German Search Report for German Application No. 102017206186 dated Apr. 11, 2017.

*Primary Examiner* — Assres H Woldemaryam
(74) *Attorney, Agent, or Firm* — Jenkins, Wilson, Taylor & Hunt, P.A.

(57) ABSTRACT

A cargo hold component system for a cargo hold of an aircraft, the cargo hold component system including floor elements and fixing elements. The floor elements can at least partially be fixed releasably by the fixing elements to fixing sites provided on or in the hold floor, such that in a state fixed to the fixing sites, the floor elements support a loading of the hold with cargo containers, and that in a state in which a first group of the floor elements has been removed from the fixing sites by release of the fixing elements and a second group of the floor elements has been partially removed from the fixing sites by release of the fixing elements, the hold is sealed gas-tightly.

17 Claims, 7 Drawing Sheets

(51) Int. Cl.
  *B65G 13/11*        (2006.01)
  *B65G 39/09*        (2006.01)
(52) U.S. Cl.
  CPC .... *B64C 2211/00* (2013.01); *B64D 2009/006* (2013.01)

(56) References Cited

U.S. PATENT DOCUMENTS

| | | | | |
|---|---|---|---|---|
| 6,729,818 | B1* | 5/2004 | Yee | B60P 7/0815 |
| | | | | 410/69 |
| 8,960,607 | B2 | 2/2015 | Dorris, III | B64D 1/12 |
| | | | | 244/137.1 |
| 9,567,166 | B2* | 2/2017 | Himmelmann | F04D 25/0613 |
| 10,196,146 | B2* | 2/2019 | Himmelmann | F04D 25/16 |
| 10,393,225 | B2* | 8/2019 | Himmelmann | B64C 1/20 |
| 2004/0265085 | A1* | 12/2004 | Mayer | B64D 9/003 |
| | | | | 410/77 |
| 2005/0224645 | A1* | 10/2005 | Huber | B64C 1/20 |
| | | | | 244/118.1 |
| 2006/0065786 | A1* | 3/2006 | Huber | B64C 1/20 |
| | | | | 244/137.1 |
| 2006/0243861 | A1* | 11/2006 | Krueger | B65G 13/12 |
| | | | | 244/137.1 |
| 2009/0304482 | A1* | 12/2009 | Sanford | B64D 9/00 |
| | | | | 414/495 |
| 2010/0143063 | A1* | 6/2010 | Dugic | B60P 7/13 |
| | | | | 410/80 |
| 2011/0215198 | A1* | 9/2011 | Panzram | B64C 1/20 |
| | | | | 244/118.1 |
| 2014/0255137 | A1* | 9/2014 | Haertel | B64D 9/00 |
| | | | | 414/529 |
| 2015/0225082 | A1* | 8/2015 | Levron | B64D 9/00 |
| | | | | 244/137.1 |
| 2016/0101857 | A1* | 4/2016 | Himmelmann | B64D 9/00 |
| | | | | 198/500 |
| 2016/0101861 | A1* | 4/2016 | Himmelmann | B60V 3/025 |
| | | | | 406/88 |
| 2016/0244186 | A1* | 8/2016 | Brown | B64C 1/20 |
| 2017/0210474 | A1* | 7/2017 | Pacheco | B60P 7/0815 |
| 2018/0050630 | A1* | 2/2018 | Kauffman | B65D 90/004 |
| 2018/0056848 | A1* | 3/2018 | Koehler | B65G 13/075 |
| 2018/0194468 | A1* | 7/2018 | Brown | B64D 9/00 |
| 2018/0251305 | A1* | 9/2018 | Nowarre | B65G 1/023 |
| 2019/0315473 | A1* | 10/2019 | Mochizuki | B64D 11/0696 |

FOREIGN PATENT DOCUMENTS

| | | |
|---|---|---|
| DE | 10339507 B4 | 3/2005 |
| DE | 102004014745 B4 | 10/2005 |
| WO | WO2011009474 A1 | 1/2011 |
| WO | WO2011064356 A2 | 6/2011 |

* cited by examiner

CARGO HOLD COMPONENT SYSTEM FOR CONVERTIBLE CARGO HOLD

CROSS-REFERENCE TO RELATED APPLICATION

This application claims priority to German patent application DE 10 2017 206 186.3 filed Apr. 11, 2017, the entire disclosure of which is incorporated by reference herein.

TECHNICAL FIELD

The disclosure herein related to a cargo hold component system for a gas-tightly sealed cargo hold, and a gas-tightly sealed cargo hold with such a cargo hold compartment system.

BACKGROUND

Cargo holds for aircraft are normally used either for loading with cargo containers or for so-called bulk loading. For loading with cargo containers, loading with often very bulky and heavy cargo containers is supported by specific cargo hold components present in the hold. Amongst other tasks, these cargo hold components here support the loading of cargo containers into the hold and the transport of the cargo containers inside the hold. Such cargo containers may be filled with several baggage items or freight of other types. For bulk loading, the hold is loaded in a loose arrangement with the individual baggage items or freight items of other types to be transported.

The cargo hold components present for loading cargo containers into the hold necessarily take up space in the hold which is then not available for receiving baggage items in the case of pure bulk loading.

There is therefore a need for an improved cargo hold concept for aircraft. In particular, there is a need for a cargo hold concept which is designed both for loading with cargo containers and for bulk loading, and at the same time guarantees the seal of the hold.

SUMMARY

According to a first aspect, a cargo hold component system for a cargo hold of an aircraft is provided. The cargo hold component system comprises several floor elements and several fixing elements. The floor elements serve for transport and securing of cargo in the hold. For example, the floor elements may be suitable for transport and securing of cargo containers in the hold. The floor elements can at least partially be fixed releasably to the hold floor by the fixing elements. The floor elements can be fixed releasably by the fixing elements to fixing sites provided on or in a hold floor, such that, in a state fixed to the fixing sites, the floor elements support a loading and unloading of the hold with cargo containers. The floor elements can be fixed releasably by the fixing elements to fixing sites provided on the hold floor such that, furthermore, in a state in which a first group of the floor elements has been removed from the fixing sites by release of the fixing elements and a second group of the floor elements has been partially removed from the fixing sites by release of the fixing elements, the hold is sealed gas-tightly.

The term "removed floor elements" used here may be understood to mean that a first group of the floor elements has been removed from the fixing sites by release of the fixing elements, and a second group of the floor elements has been partially removed from the fixing sites by release of the fixing elements. In the second group of the floor elements, some may remain at the respective fixing sites.

The term "hold floor" here does not necessarily mean an exclusively flat, horizontal floor of the hold. Rather, floor elements may be releasably attached to fixing sites which lie on a sloping or side portion of the hold (for example, a raised portion of the hold).

For pure bulk loading, the floor elements may at least partially be removed from the fixing sites. This creates more available space in the hold. Furthermore, a weight reduction of the aircraft may be achieved if the floor elements are removed from the aircraft.

At least one of the floor elements may be configured multipiece, wherein for pure bulk loading, at least one part of a multipiece floor element is removed from the corresponding fixing site by release of the fixing element(s), and at least a further part of the multipiece floor element remains at the corresponding fixing site after release of the fixing element(s). The part(s) of the multipiece floor element remaining in the hold is/are connected to the hold floor such that the hold remains sealed gas-tightly. For example, seals may be provided at interfaces between a remaining floor element part and the hold floor. Thus a floor element part remaining in the hold may be attached to the primary structure of the aircraft, and be connected gas-tightly to portions of the hold floor.

When loading with cargo containers, the floor elements are fixed in the hold and support the loading with cargo containers in the usual fashion. Thus the hold may be adapted or configured flexibly to loading with cargo containers and bulk loading.

Both when the floor elements are fixed and when the floor elements are removed, it is also guaranteed that the hold is sealed gas-tightly. This is achieved, inter alia, in that in both states, i.e. in the state in which the floor elements are fixed and in the state in which the floor elements are removed, and even during removal of the floor elements, the hold floor remains unchanged. Only the floor elements arranged on or in the hold floor are removed. The hold floor itself remains unchanged by the release of the floor elements. This has the additional advantage that for pure bulk loading, an (almost continuously) flat hold floor is available, thus avoiding both injury to loading and unloading personnel and damage to the baggage and freight items stored in the hold.

The concept that the floor elements can be fixed releasably by the fixing elements to fixing sites provided on a hold floor, does not necessarily mean that the floor elements are fixed/attached to the hold floor, but rather that the floor elements lie directly or indirectly on or in the hold floor. The releasable fixing/attachment of the floor elements may take place at least partially onto the hold floor, but at least partially also by fixing of the floor elements to each other, and/or at least partially by fixing the floor elements by fixing elements and/or floor elements which are connected to the primary structure of the aircraft.

At least one of the floor elements may be configured as part of a roller conveyor which can be fixed in the longitudinal direction of the hold. Cargo containers can be moved on the roller conveyor and thus moved in the longitudinal direction in the hold. Furthermore, the cargo containers may be fixed to the roller conveyor so that they do not change position during the flight.

The roller conveyor may be formed multipiece. A first part of the roller conveyor may be attached fixedly on or in the hold floor. The first part of the roller conveyor may also be fixable to a primary structure of the aircraft, wherein the hold floor at least abuts or adjoins the first part of the roller conveyor on both long sides. At these abutment points between the first part of the roller conveyor and the hold floor, a seal may be provided in order to seal the hold gas-tightly. A second part of the roller conveyor may be fixable releasably to the first part. In this way, the second part may be fixed or be fixable indirectly releasably on or in the hold floor, for example by one of the fixing elements.

The roller conveyor may have a counter fixing element. The counter fixing element may be configured to cooperate with one of the fixing elements such that, in a fixed state, a form fit between the fixing element and the counter fixing element prevents a movement of the roller conveyor in at least two directions. For example, the counter fixing element may be configured to cooperate with one of the fixing elements such that, in a fixed state, a form fit between the fixing element and the counter fixing element prevents a movement of the roller conveyor in at least a longitudinal and a height direction of the hold. The counter fixing element may also be configured to cooperate with one of the fixing elements such that, in a released state, a movement of at least one part of the roller conveyor is possible in at least one direction. For example, the counter fixing element may be configured to cooperate with one of the fixing elements such that, in a released state, a movement of at least one part of the roller conveyor is possible in at least the longitudinal direction of the hold.

In the case of a multipiece roller conveyor, for example a two-piece roller conveyor, the first part of the roller conveyor may comprise a first counter fixing element and the second part of the roller conveyor may comprise a first fixing element. The first counter fixing element may be configured in the form of protrusions which extend in the transverse direction towards a central longitudinal axis of the first part of the roller conveyor and in the longitudinal direction, while the fixing element may be configured in the form of protrusions which extend in the transverse direction away from a central longitudinal axis of the second part of the roller conveyor and also in the longitudinal direction. Here a gap is created between the protrusions in the longitudinal direction of the respective part of the roller conveyor, through which gap a corresponding protrusion of the respective other part of the roller conveyor fits in the height direction. After subsequent relative displacement of the second part of the roller conveyor relative to the first part of the roller conveyor, the protrusions of the first and second parts overlap in pairs in the height direction, whereby a movement of the second part of the roller conveyor at least in the height direction of the hold is prevented. Furthermore, the first part of the roller conveyor may comprise a second counter fixing element, and the second part of the roller conveyor may comprise a second fixing element. The second fixing element of the second part of the roller conveyor may be configured in the form of a bolt with or without an outer thread, a quarter-turn fastener etc., which can engage effectively in a corresponding second counter fixing element on the first part of the roller conveyor, so that a movement of the second part of the roller conveyor in at least two directions, such as e.g. the longitudinal and height directions, but also the transverse direction of the hold, is prevented.

At least one of the floor elements may be formed as a ball mat. The ball mat may be fixable releasably at a fixing site provided in the region of a loading opening of the hold.

The ball mat may comprise, on an outer face, at least one of the fixing elements. For example, the ball mat may comprise, on an outer face, at least one protrusion protruding from the outer face as a fixing element. The fixing element may be configured to cooperate with at least one counter fixing element, for example an associated opening, of a roller conveyor which can be fixed in the longitudinal direction of the hold, such that in a fixed state, a form fit between the fixing element and the counter fixing element prevents a movement of the ball mat in at least two directions. For example, the fixing element may be configured to cooperate with at least one counter fixing element, for example an associated opening, of a roller conveyor which can be fixed in the longitudinal direction of the hold, such that in a fixed state, a form fit between the fixing element and the counter fixing element prevents a movement of the ball mat at least in the longitudinal and height directions of the hold. The fixing element may also be configured to cooperate with at least one counter fixing element, for example an associated opening, of a roller conveyor which can be fixed in the longitudinal direction of the hold, such that in a released state, a movement of the ball mat is possible in at least one direction. For example, the fixing element may be configured to cooperate with at least one counter fixing element, for example an associated opening, of a roller conveyor which can be fixed in the longitudinal direction of the hold, such that in a released state, a movement of the ball mat is possible at least in the height direction of the hold.

The ball mat may comprise, on an outer face, a counter fixing element. The counter fixing element may be configured to cooperate with one of the fixing elements at an associated lock such that, in a fixed state, a form fit between the fixing element and the counter fixing element prevents a movement of the ball mat in several directions. For example, the counter fixing element may be configured to cooperate with a fixing element at an associated lock such that, in a fixed state, a form fit between the fixing element and the counter fixing element prevents a movement of the ball mat in the longitudinal, transverse and height directions of the hold. The counter fixing element may also be configured to cooperate with one of the fixing elements at an associated lock such that, in a released state, a movement of the ball mat is possible in at least one direction. For example, the counter fixing element may also be configured to cooperate with one of the fixing elements at an associated lock such that, in a released state, a movement of the ball mat is possible at least in the height direction of the hold.

For example, the counter fixing element on the outer face of the ball mat may be a fork, and the fixing element at the associated lock may be a protrusion or a bar, wherein each part of the fork has an opening or bore, and the protrusion or bar also has a corresponding opening or bore so that a bolt can be passed through a first part of the fork, through the protrusion or bar and through a second part of the fork. In this way, the form fit between the fixing element and the counter fixing element can be created and secured.

At least one of the floor elements may be configured as a loading hatch lock. The loading hatch lock may be fixable releasably at a fixing site provided in the region of a loading opening of the hold.

The floor element configured as a loading hatch lock may comprise, on at least one outer face, at least one of the fixing elements, for example at least one protrusion which protrudes from the outer face. The fixing element may be configured to cooperate with a counter fixing element, for example an associated opening, of a roller conveyor which can be fixed in the longitudinal direction of the hold, such that in a fixed state, a form fit between the fixing element and the counter fixing element prevents a movement of the floor element configured as a loading hatch lock in at least two directions. For example, the fixing element may be configured to cooperate with a counter fixing element, for example an associated opening, of a roller conveyor which can be fixed in the longitudinal direction of the hold, such that in a fixed state, a form fit between the fixing element and the counter fixing element prevents a movement of the floor element configured as a loading hatch lock at least in the longitudinal and height directions of the hold. The fixing element may be configured to cooperate with a counter fixing element, for example an associated opening, of a roller conveyor which can be fixed in the longitudinal direction of the hold, such that in a released state, a movement of the floor element configured as a loading hatch lock is possible in at least one direction. For example, the fixing element may be configured to cooperate with a counter fixing element, for example an associated opening, of a roller conveyor which can be fixed in the longitudinal direction of the hold, such that in a released state, a movement of the floor element configured as a loading hatch lock is possible at least in the height direction of the hold.

The floor element configured as a loading hatch lock may comprise, on its underside, an undercut protrusion as one of the fixing elements. The undercut protrusion may be configured to engage in a guide rail which can be fixed firmly in the hold, such that in a fixed state, a form fit between the undercut protrusion and the guide rail prevents a movement of the floor element configured as a loading hatch lock in at least one direction. For example, the undercut protrusion may be configured to engage in a guide rail which can be fixed firmly in the hold, such that in a fixed state, a form fit between the undercut protrusion and the guide rail prevents a movement of the floor element configured as a loading hatch lock in the transverse or height direction of the hold. The undercut protrusion may be configured to engage in a guide rail which can be fixed firmly in the hold, such that in a released state, a movement of the floor element configured as a loading hatch lock is possible in at least one direction. For example, the undercut protrusion may be configured to engage in a guide rail which can be fixed firmly in the hold, such that in a released state, a movement of the floor element configured as a loading hatch lock is possible at least in the transverse direction of the hold.

Furthermore, the undercut protrusion may be configured to be inserted in a guide rail, which can be fixed firmly in the hold, and to be moved in the transverse direction of the hold.

The loading hatch lock may be fixedly connected to or formed integrally with a ball mat.

At least one of the floor elements may be configured as an inlet guide. The inlet guide may be fixable releasably at a fixing site provided in the region of a loading opening of the hold.

The floor element configured as an inlet guide may comprise, on at least one outer face, at least one of the fixing elements, for example at least one protrusion which protrudes from the outer face. The fixing element may be configured to cooperate with a counter fixing element, for example an associated opening, of a roller conveyor which can be fixed in the longitudinal direction of the hold, such that in a fixed state, a form fit between the fixing element and the counter fixing element prevents a movement of the floor element configured as an inlet guide in at least two directions. For example, the fixing element may be configured to cooperate with a counter fixing element, for example an associated opening, of a roller conveyor which can be fixed in the longitudinal direction of the hold, such that in a fixed state, a form fit between the fixing element and the counter fixing element prevents a movement of the floor element configured as an inlet guide at least in the longitudinal and height directions of the hold. The fixing element may be configured to cooperate with a counter fixing element, for example an associated opening, of a roller conveyor which can be fixed in the longitudinal direction of the hold, such that in a released state, a movement of the floor element configured as an inlet guide is possible in at least one direction. For example, the fixing element may be configured to cooperate with a counter fixing element, for example an associated opening, of a roller conveyor which can be fixed in the longitudinal direction of the hold, such that in a released state, a movement of the floor element configured as an inlet guide is possible at least in the height direction of the hold.

The floor element configured as an inlet guide may comprise, on its underside, an undercut protrusion as one of the fixing elements. The undercut protrusion may be configured to engage in a guide rail which can be fixed firmly in the hold, such that in a fixed state, a form fit between the undercut protrusion and the guide rail prevents a movement of the floor element configured as an inlet guide in at least one direction. For example, the undercut protrusion may be configured to engage in a guide rail which can be fixed firmly in the hold, such that in a fixed state, a form fit between the undercut protrusion and the guide rail prevents a movement of the floor element configured as an inlet guide in the transverse or height direction of the hold. The undercut protrusion may be configured to engage in a guide rail which can be fixed firmly in the hold, such that in a released state, a movement of the floor element configured as an inlet guide is possible in at least one direction. For example, the undercut protrusion may be configured to engage in a guide rail which can be fixed firmly in the hold, such that in a released state, a movement of the floor element configured as an inlet guide is possible at least in the transverse direction of the hold.

Furthermore, the undercut protrusion may be configured to be inserted in a guide rail, which can be fixed firmly in the hold, and to be moved in the transverse direction of the hold.

The inlet guide may be fixedly connected to or formed integrally with a ball mat.

At least one of the floor elements may be configured as a two-piece lock.

A first part of the lock may be configured such that it can be attached fixedly to the hold floor. A second part of the lock may be configured such that it can be fixed releasably to the first part. The first part of the lock may also be fixable to a primary structure of the aircraft, wherein the hold floor abuts or adjoins at least one peripheral side of the first part of the lock. At the abutment point(s) between the first part of the lock and the hold floor, a seal may be provided to seal the hold gas-tightly.

The lock may comprise a protrusion. The protrusion may be configured to cooperate with a counter fixing element of one of the floor elements such that, in a fixed state, a form fit between the protrusion and the counter fixing element prevents a movement of the floor element in several directions. For example, the protrusion may be configured to cooperate with a counter fixing element of one of the floor elements such that in a fixed state, a form fit between the protrusion and the counter fixing element prevents a movement of the floor element in the longitudinal, transverse and height directions of the hold. The protrusion may also be configured to cooperate with a counter fixing element of one of the floor elements such that in a released state, a movement of the floor element is possible in at least one direction. For example, the protrusion may also be configured to cooperate with a counter fixing element of one of the floor elements such that in a released state, a movement of the floor element is possible at least in the height direction of the hold.

Alternatively or additionally, the lock, for example the second part of the lock, may comprise a roller. The roller is arranged on the lock such that it supports a loading and unloading of the hold with cargo containers.

A counter fixing element may be arranged on the first part of the lock. The counter fixing element may be arranged on a portion of the first part of the lock which is not covered by the second part of the lock when the second part of the lock is fixed to the first part of the lock. The counter fixing element of the first part of the lock may cooperate with a fixing element of a capture or holding device, such that the capture or holding device is held in several directions on the first part of the lock. For example, the counter fixing element of the first part of the lock may cooperate with the fixing element of a capture or holding device, such that the capture or holding device is held in a longitudinal, transverse and height direction of the hold. The capture or holding device may thus be attached to the first part of the lock when the second part of the lock has been removed (released). Thus the capture or holding element may be used to secure loose baggage items (freight items) when the hold is used for bulk loading.

According to a second aspect, an aircraft is provided. The aircraft has a cargo hold compartment system as described herein. Thus an aircraft with an adaptable hold may be provided. The hold may be adapted or configured flexibly to loading with cargo containers and bulk loading.

With both fixed floor elements and with removed floor elements, it is guaranteed that the aircraft hold is sealed gas-tightly. This is achieved, inter alia, in that in both states, i.e. in the state in which the floor elements are fixed and in the state in which the floor elements are removed, and even during removal of the floor elements, the hold floor remains unchanged. Only the floor elements arranged on or in the hold floor are at least partially removed. The hold floor itself remains unchanged by the release of the floor elements or part of the floor elements.

Although some of the aspects and details described above have been described in relation to the cargo hold component system, these aspects may also be implemented accordingly in the hold. Furthermore, the features of the cargo hold component system described should not be regarded as stand-alone features. Rather, all features of the cargo hold component system may be combined with an arbitrary number of other described features.

Further features, properties, advantages and possible derivations will be evident to the person skilled in the art from the description below which refers to the attached, example drawings. All features described and/or depicted in the drawings, alone or in arbitrary combinations, indicate the object disclosed herein. The dimensions and proportions of the components shown in the figures are not to scale.

BRIEF DESCRIPTION OF THE DRAWINGS

The disclosure herein will be explained in more detail with reference to figures. The example figures referenced below illustrate schematically.

DETAILED DESCRIPTION

In the description below, without being restricted hereto, specific details are presented in order to give a complete understanding of the disclosure herein. It is however clear to a person skilled in the art that the disclosure herein may be used in other exemplary embodiments which may differ from the details outlined below. The figures serve furthermore merely to illustrate exemplary embodiments. They are not to scale and serve merely to illustrate by example the general concept of the invention. For example, features contained in the figures must not considered to be essential components.

Comparable or identical components and features, or those with similar effect, carry the same reference signs in the figures. For reasons of clarity, in the figures sometimes the reference signs of individual features and components have been omitted, wherein these features and components carry reference signs in the other figures.

Figure 1:
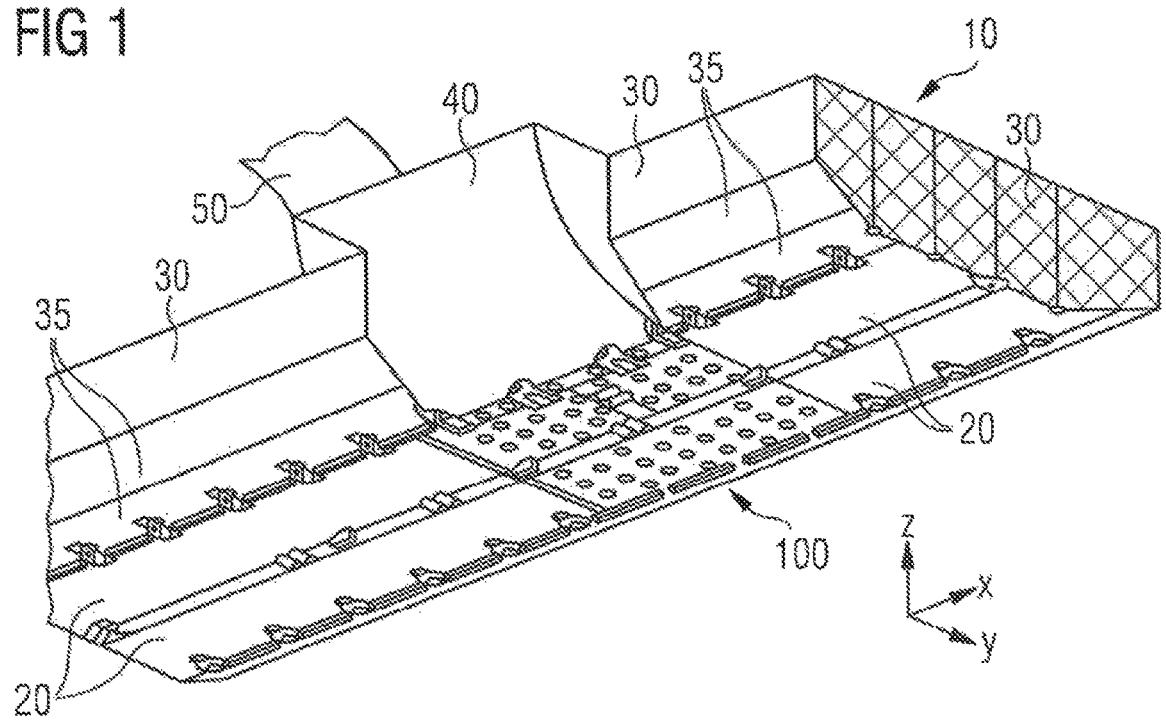
FIG. 1 is a diagrammatic, perspective view of a cargo hold with a cargo hold component system.

FIG. 1 is a diagrammatic, perspective view of a cargo hold 10 with a cargo hold component system 100. The hold 10 has a hold floor 20 which serves for gas-tight sealing of the hold 10. For example, edges of the hold floor 20 which abut a hold wall 30 are provided with a seal (not shown), so as to create a gas-tight envelope for the hold 10 between the hold floor 20 and the hold wall 30. The hold wall 30 and/or the hold floor 20 may also have sloping surfaces 35, which may be assigned to either the hold floor 20 or to the hold wall 30. Elements which form the sloping surfaces 35 are also provided with seals at abutment points to the elements of the hold floor 20 and/or a hold wall 30 and/or a further sloping surface 35, in order to form a further part of the gas-tight envelope for the hold 10.

Furthermore, the hold 10 is accessible from the outside through a hold opening 40. The hold opening 40 is dimensioned such that firstly cargo containers and secondly loose freight items, such as for example baggage items, can be loaded in and unloaded from the hold 10. Furthermore, a loading hatch or hold hatch 50 (shown only partially in FIG. 1) is provided at the hold opening 40. By closing the hold hatch 50, the hold hatch 50 may also adjoin a part of the hold wall 30, the sloping surfaces 35 and/or the hold floor 20, and seal the hold opening 40 gas-tightly by a suitable seal. Together with the hold roof (not shown in FIG. 1), a hold 10 can be formed which is sealed gas-tightly. This gas-tightly sealed hold 10 may, for example during flight phases, have an air pressure which differs from that of the aircraft environment, for which reason a gas-tightly sealed hold 10 is necessary for maintaining an optimum atmosphere inside the hold 10.

Inside the hold 10, and in particular on or in the hold floor 20, a cargo hold component system 100 is provided. The cargo hold component system 100 comprises several floor elements (for transport and securing of cargo in the hold) and several fixing elements, wherein the floor elements can at least partially be fixed releasably by the fixing elements to fixing sites provided on or in the hold floor such that, in a state fixed to the fixing sites, the floor elements support a loading of the hold 10 with cargo containers, and that in a state in which a first group of the floor elements has been removed from the fixing sites by release of the fixing elements and a second group of the floor elements has been partially removed from the fixing sites by release of the fixing elements, the hold 10 is (remains) sealed gas-tightly.

Figure 2:
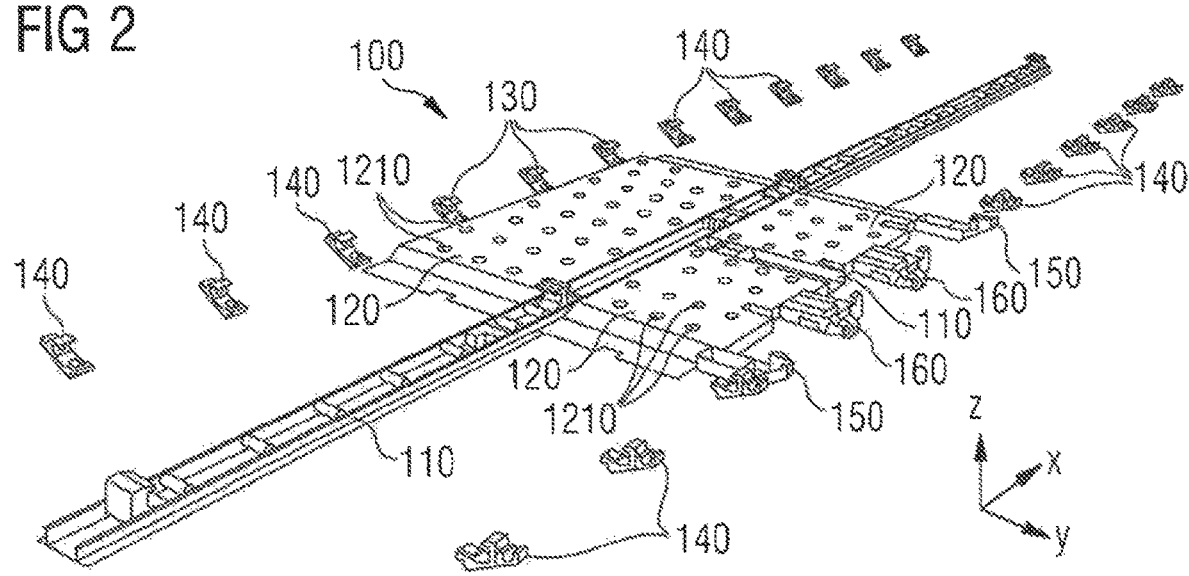
FIG. 2 is a diagrammatic depiction of floor elements of a cargo hold component system.

FIG. 2 is a diagrammatic depiction of a cargo hold component system 100 which comprises a plurality of floor elements. The cargo hold component system 100 furthermore comprises fixing elements or components which are not shown explicitly in FIG. 2. The floor elements may be divided into different groups.

For example, the cargo hold component system 100 comprises first floor elements 110 which serve for transport and fixing of cargo containers in the hold 10. The first floor elements 110 may run in the longitudinal direction of the hold 10 (X direction) and hence in the longitudinal direction of the aircraft. The first floor elements 110 may have a length such that they can easily be detached from an associated fixing site and stored inside or outside the aircraft. For example, the first floor elements 110 may have a length of around 150 cm. The first floor elements 110 running in the longitudinal direction of the hold 10 may be configured as roller conveyors.

A further first floor element 110 may run in the transverse direction of the hold 10 (Y direction) in the region of the hold opening 40. This first floor element 110 in the transverse direction of the hold 10 serves to receive a cargo container to be transported in the hold 10, and furthermore prevents a cargo container in the hold 10 from falling out through the hold opening 40. The first floor element(s) 110 which run in the transverse direction of the hold 10 may contain a braking roller and/or an (electrical) drive unit for moving the cargo containers.

Furthermore, the cargo hold component system 100 comprises second floor elements 120 which are arranged in particular in a region of the hold 10 in front of the hold opening 40. These flat second floor elements 120 may contain balls 1210 or rollers on which cargo containers can be moved easily during loading and unloading. Such second floor elements 120 are also described as a ball mat.

The second floor elements 120 are releasably fixed to third floor elements 130 on a side of the hold 10 lying opposite the hold opening 40. The third floor elements 130 also serve as a stop for receiving a cargo container on loading of the cargo container on the side of the hold 10 lying opposite the hold opening 40. The third floor elements 130 are configured to guide a cargo container, which rolls on the balls 1210 of the second floor element 120, in the longitudinal direction of the hold 10 so that this can roll onto one of the first floor elements 110.

In the same way as the third floor elements 130 and on the opposite side, fourth floor elements 140 run in the longitudinal direction on both sides of the hold opening 40. These differ from the third floor elements 130 in that they comprise rollers on which a cargo container can roll in the longitudinal direction of the hold 10. In order to be able to push a cargo container in the longitudinal direction of the hold 10, this lies on the first floor elements 110 and on pairs of opposing fourth floor elements 140 (or more precisely, on rollers of the first and fourth floor elements).

Towards the hold opening 40, fifth floor elements 150 and sixth floor elements 160 may be arranged on the second floor elements 120 or integrated in the second floor elements 120. A fifth floor element 150 may comprise an inlet guide which offers a lateral guidance of a cargo container on loading and unloading through the hold opening 40. The fifth floor element 150 thus ensures that, in the longitudinal direction of the hold, a cargo container does not collide with the elements of the aircraft forming the hold opening 40. To protect both sides of the hold opening 40, two fifth floor elements 150 are arranged in the region of a corner between the hold opening 40 and the hold floor 20.

A sixth floor element 160 constitutes a loading hatch lock 161 or comprises a loading hatch lock 161. This secures a cargo container during loading and unloading through the hold opening 40. This prevents the cargo container from accidentally rolling or falling out of the hold opening 40.

The floor elements 110 to 160 depicted in FIG. 2 may be stowed in a receiver device (movable case) in the hold 10. Thus it is possible to configure the hold 10 for cargo containers or for bulk loading, depending on the needs for cargo transport, before each flight. The receiver device for the floor elements 110 to 160 may also be removed from the hold 10, thus saving weight and hence fuel for the next flight.

Figure 3:
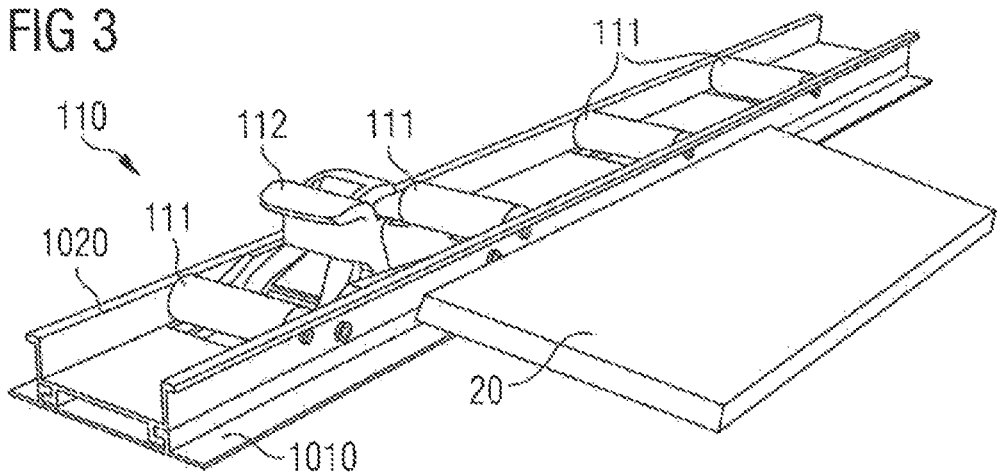
FIG. 3 is a diagrammatic, perspective view of a first floor element.

FIG. 3 is a diagrammatic, perspective, detail view of a first floor element 110. The first floor element 110 configured as a roller conveyor comprises rollers 111 for transporting cargo containers in the longitudinal direction of the hold 10, and securing elements 112 for fixing and securing cargo containers against accidental movement during the flight.

The first floor element 110 (here also interchangeable with the term "roller conveyor") is configured multipiece. A first part 1010 of the roller conveyor 110 can be attached fixedly on or in the hold floor 20, while a second part 1020 of the roller conveyor 110 can be fixed releasably to the first part 1010. The first part 1010 may be arranged on a continuous hold floor 20 or accommodated in a depression of a continuous hold floor 20. Alternatively, the first part 1010 may also be fixed to a primary structure of the aircraft (not shown explicitly in FIG. 3) and connected gas-tightly and flush with two elements of the hold floor 20 on both its long sides. Such an element of the hold floor 20 is shown in FIG. 3. Accordingly, on the opposite side, a further element of the hold floor 20 would be connected gas-tightly to the opposing long side of the first part 1010, which is not shown for reasons of clarity. In each case, the first part 1010 of the roller conveyor 110 constitutes a fixing site for the second part 1020 of the roller conveyor 110, wherein by releasing fixing elements (not shown explicitly in FIG. 3), the second part 1020 of the roller conveyor 110 can be removed, wherein the hold 10 continues to remain sealed gas-tightly.

Figure 4:
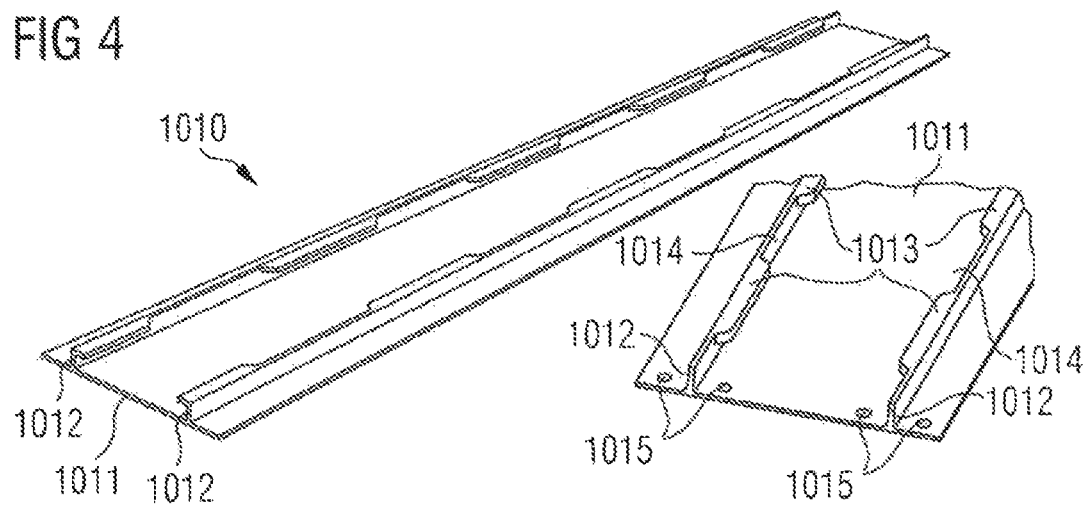
FIG. 4 is a diagrammatic, perspective view of a first part of the first floor element from FIG. 3, including a detail view of an end portion of the first part of the first floor element.

FIG. 4 is a diagrammatic, perspective view of a first part 1010 of the first floor element 110 (roller conveyor 110) from FIG. 3, including a detail view of an end portion of the first part 1010. The first part 1010 of the roller conveyor 110 consists of or comprises a flat floor component 1011 and two angled components 1012 running thereon in the longitudinal direction of the roller conveyor 110. The angled components 1012 are arranged on the floor component 1011 such that their horizontally running legs (legs running in the X-Y plane) run towards each other.

The horizontally running legs of the angled components 1012 may be configured in portions as protrusions 1013. Between the protrusions 1013 lie cut-outs 1014, at which the angled component 1012 is cut away either fully or partly. The protrusions 1013 form fixing elements for the second part 1020 of the roller conveyor 110.

Figure 6:
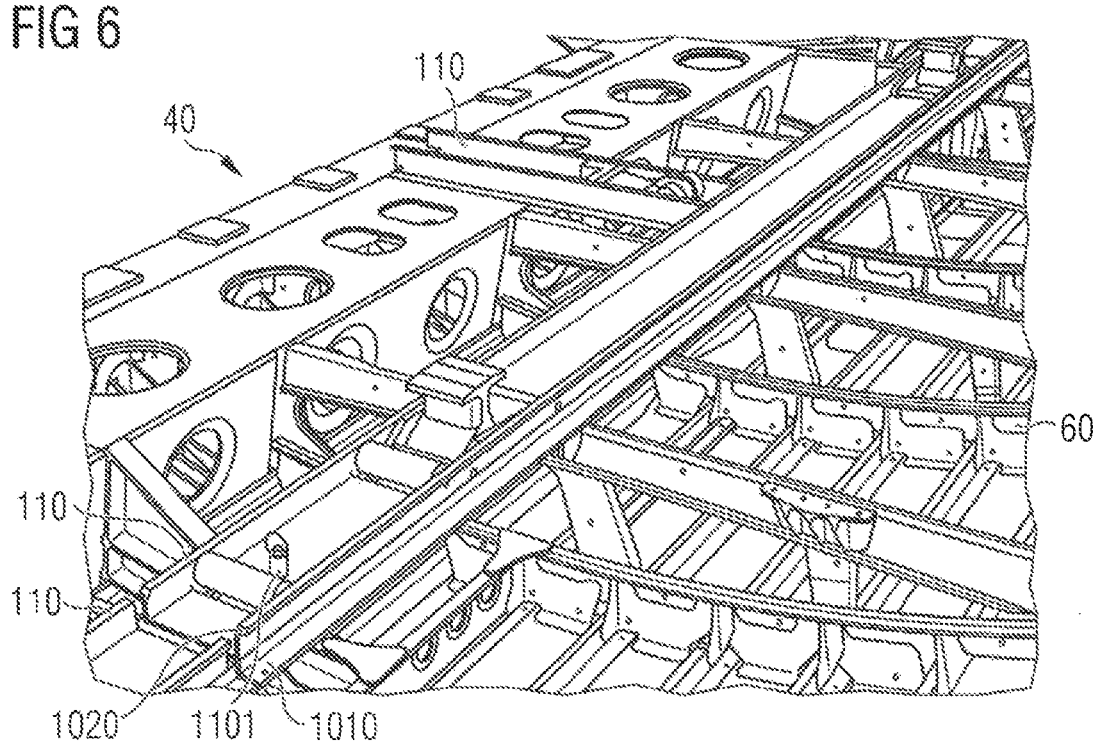
FIG. 6 is a diagrammatic, perspective view of several first floor elements in a hold, without showing the hold floor.

Further fixing elements 1015 are also provided on the first part 1010 of the roller conveyor 110 in order to attach the first part 1010 of the roller conveyor 110 to the hold floor 20 and/or to a primary structure 60 of the aircraft (FIG. 6). The fixing elements 1015 may be implemented as bores in the first part 1010 of the roller conveyor 110, through which bolts or other fasteners may be guided in order to attach the first part 1010 of the roller conveyor 110 to the hold floor 20 and/or to the primary structure 60 of the aircraft. The fixing elements 1015 may correspond to those from conventional cargo hold systems, so that the cargo hold component system of the disclosure herein can easily be installed in existing aircraft.

Figure 5:
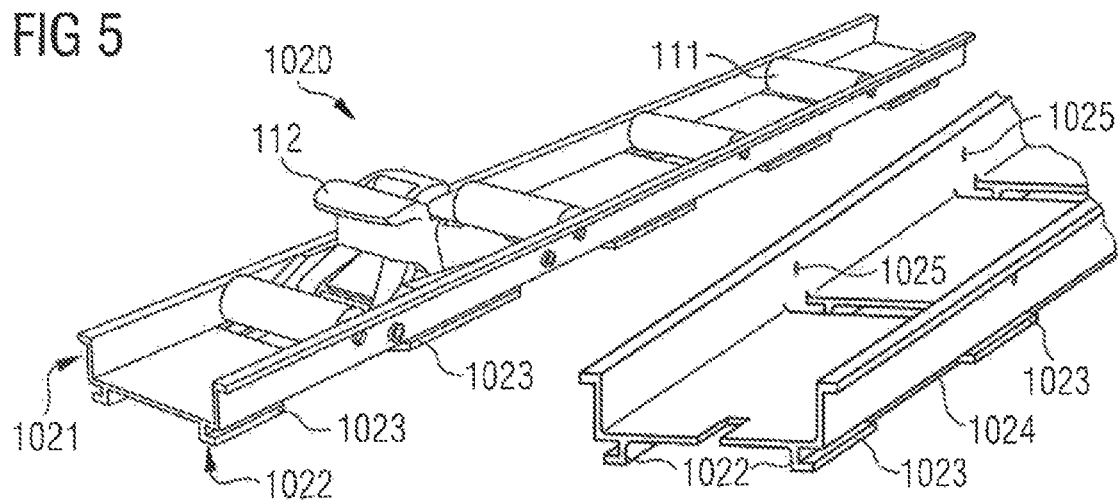
FIG. 5 is a diagrammatic, perspective view of a second part of the first floor element from FIG. 3, including a detail view of an end portion of the second part of the first floor element.

FIG. 5 is a diagrammatic, perspective view of a second part 1020 of the first floor element 110 (the roller conveyor) from FIG. 3, including a detail view of an end portion of the second part 1020. The second part 1020 of the roller conveyor 110 consists of or comprises a trough-like component 1021 which corresponds in cross-section to a flat U-shaped profile. Optionally, outwardly directed flanges may be arranged at an upper end of the U-shaped profile of the component 1021. These flanges facilitate extraction of the second part 1020 of the roller conveyor 110 in the Z direction. Furthermore, the flanges may also lie flush on a top side of the hold floor 20, in order to form a floor which is as flush as possible. Also optionally, openings or bores 1025 may be provided in the vertical portions (running in the Z direction) of the trough-like component 1021. These serve firstly to receive bearings of the rollers 111 and to receive bearings of the securing elements 112. Further openings or bores 1025 may also serve as a counter fixing element for a second floor element 120 for example, as described in relation to FIG. 11.

Two angled components 1022, running in the longitudinal direction of the roller conveyor 110, are arranged on an underside of the trough-like component 1021 (on a side facing away from the hold 10 when the roller conveyor 110 is in the installed state). The angled components 1020 are arranged on the trough-like component 1021 such that their horizontally running legs (legs running in the X-Y plane) point away from each other.

The horizontally running legs of the angled components 1022 may be configured in portions as protrusions 1023. Between the protrusions 1023 lie cut-outs 1024, at which the angled component 1022 is cut away fully or partly. The protrusions 1023 form counter fixing elements for the second part 1020 of the roller conveyor 110, for fixing to the first part 1010 of the roller conveyor 110.

Each of the cut-outs 1014 of the angled components 1012 of the first part 1010 of the roller conveyor 110 is dimensioned, in the longitudinal direction of the roller conveyor 110, such that a protrusion 1023 of the angled component 1022 of the second part 1020 of the roller conveyor 110 in the Z direction fits through the corresponding cut-out 1014 of the angled component 1012 of the first part 1010 of the roller conveyor 110. Accordingly, each of the cut-outs 1024 of the angled components 1022 of the second part 1020 of the roller conveyor 110 is dimensioned, in the longitudinal direction of the roller conveyor 110, such that a protrusion 1013 of the angled component 1012 of the first part 1010 of the roller conveyor 110 in the Z direction fits through the corresponding cut-out 1024 of the angled component 1022 of the second part 1020 of the roller conveyor 110.

Furthermore, the vertical legs (legs running in the X-Z plane) of the angled components 1012 of the first part 1010 of the roller conveyor 110, and the vertical legs (legs running in the X-Z plane) of the angled components 1022 of the second part 1020 of the roller conveyor 110, are spaced apart from each other in the Y direction such that the vertical legs of the angled components 1022 of the second part 1020 of the roller conveyor 110 lie on or almost against the protrusions 1013 of the first part 1010 of the roller conveyor 110, and the vertical legs of the angled components 1012 of the first part 1010 of the roller conveyor 110 lie on or almost against the protrusions 1023 of the second part 1020 of the roller conveyor 110.

Thus the angled components 1012 and 1022 of the first and second parts 1010, 1020 of the roller conveyor 110 are pushed into each other in the Z direction as described above, wherein each time a protrusion 1013, 1023 is guided through a cut-out 1014, 1024. Then the second part 1020 of the roller conveyor 110 can be moved in the longitudinal direction of the first part 1010 of the roller conveyor 110 (in the longitudinal direction of the hold 10) so that the respective protrusions 1013, 1023 of the first and second parts 1010, 1020 of the roller conveyor 110 overlap in the Z direction.

Thus the angled components 1012 of the first part 1010 of the roller conveyor 110 form fixing elements and the angled components 1022 of the second part 1020 of the roller conveyor 110 form counter fixing elements which cooperate such that, in a fixed state, a form fit between a fixing element 1012 and a counter fixing element 1022 prevents a movement of the roller conveyor 110 in at least two directions, for example in the height direction and transverse direction of the hold (in the Z and Y directions). Thus the second part 1020 of the roller conveyor 110 is hindered in its movement in the Z and Y directions, and at least partially fixed. In a released state, i.e. the protrusions 1013, 1023 have been placed, by longitudinal displacement of the second part 1020 of the roller conveyor 110, in a position opposite the recesses 1014, 1024 of the respective other angled component 1012, 1022 of the other part 1010, 1020 of the roller conveyor 110, the fixing element and counter fixing element cooperate such that a movement of the at least one part of the roller conveyor 110 is possible in one direction, for example in the height direction of the hold 10 (Z direction). A movement in the transverse direction of the hold 10 (Y direction) is still fixed as long as the vertical legs of the angled components 1012, 1022 overlap in the Y direction.

The first part 1010 of the roller conveyor 110 may also be configured multipiece. For example, several first parts 1010 of the roller conveyor 110 with angled components 1012 may be attached on or in the hold floor 20 or the primary structure 60 of the aircraft. Thus the several first parts 1010 of the roller conveyor 110 may have a length in the longitudinal direction which corresponds to the length of the protrusions 1013, while in the portions at which cut-outs 1014 must be provided, no first part 1010 of the roller conveyor 110 is installed in the hold. In this way, a hold floor 20 can be created which can be configured continuously at several points in the transverse direction of the hold 10. A second part 1020 of the roller conveyor 110 may be fixed to several such first parts 1010 of the roller conveyor 110.

FIG. 6 is a diagrammatic, perspective view of several first floor elements 110 in a hold, without depicting the hold floor 20. In the exemplary depiction of FIG. 6, the first part 1010 of the roller conveyor 110 is attached to the primary structure 60 of the aircraft. FIG. 6 also shows a region next to/in front of the hold opening 40. This region contains the second floor elements 120 (not shown in FIG. 6), for which reason the first floor element 110 has no rollers.

In FIG. 6, the roller conveyor 110 is shown in a fixed state. Here the protrusions 1013, 1023 of the first and second parts 1010, 1020 of the roller conveyor 110 overlap in the Z direction. Furthermore, the movement of the second part 1020 of the roller conveyor 110 is prevented by further fixing elements. FIG. 6 shows a fixing element 1101 in the form of a bolt or other fastener. This fixing element 1101 is guided through a corresponding opening in the second part 1020 of the roller conveyor 110 and has a head with a larger diameter than the bolt.

Figure 7:
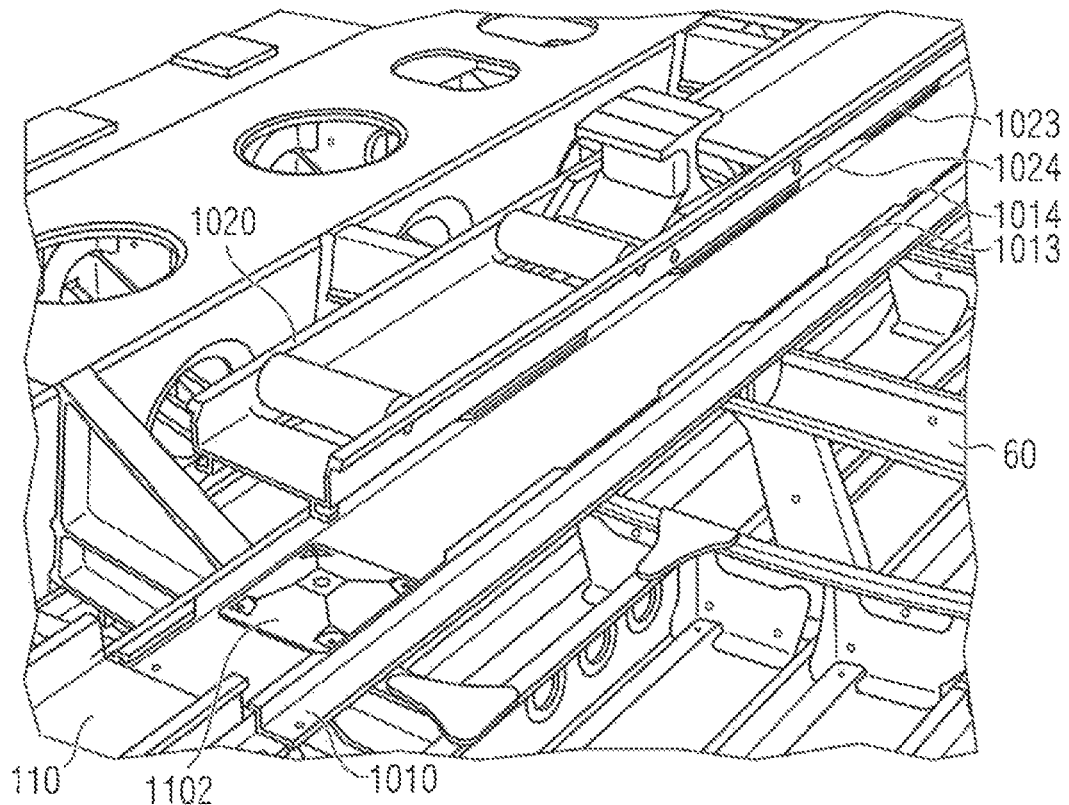
FIG. 7 is a diagrammatic, perspective, detail view from FIG. 6, in which a second part of the first floor element is in a state released from a first part of the first floor element.

FIG. 7 is a diagrammatic, perspective, detail view from FIG. 6, containing a second part 1020 of the first floor element 110 in a state released from a first part 1010 of the first floor element 110. Here, the fixing element 1101 has been removed from a counter fixing element 1102. For example, the counter fixing element 1102 may have a threaded opening. A fixing element 1101 with a corresponding thread may be screwed into this and fixed, then unscrewed again and released. Alternatively, the fixing element 1101 and the counter fixing element 1102 may be implemented in the form of a quarter-turn fastener. The counter fixing element 1102 is arranged on the floor component 1011 of the first part 1010 of the roller conveyor 110 between the two angled components 1012.

Thus the fixing element 1101 and the counter fixing element 1102 cooperate such that, in a fixed state, a form fit between the fixing element 1101 and the counter fixing element 1102 prevents a movement of the roller conveyor 110 in at least two directions, for example in the height direction and the longitudinal direction of the hold 10 (the Z and X directions). In this way, the movement of the second part 1020 of the roller conveyor 110 in the Z and X directions is prevented, and it is at least partially fixed. In a released state, i.e. the fixing element 1101 has been removed from the counter fixing element 1102, the fixing element 1101 and the counter fixing element 1102 no longer cooperate, so that a movement of at least part of the roller conveyor 110 is possible in at least one direction, for example in the longitudinal direction of the hold (Z direction).

In this way, the second part 1020 of the roller conveyor 110 can be moved in the longitudinal direction of the hold 10 or roller conveyor 110 (X direction), whereby the further fixing element 1012 and counter fixing element 1022 are brought into a released state. Then the second part 1020 of the roller conveyor 110 can be removed completely. The second part 1020 of the roller conveyor 110 can then be removed from the aircraft or stowed in a corresponding storage container in the hold 10. The first part 1010 of the roller conveyor 110 remains in the hold 10 so that the hold 10 remains sealed gas-tightly.

Figure 8:
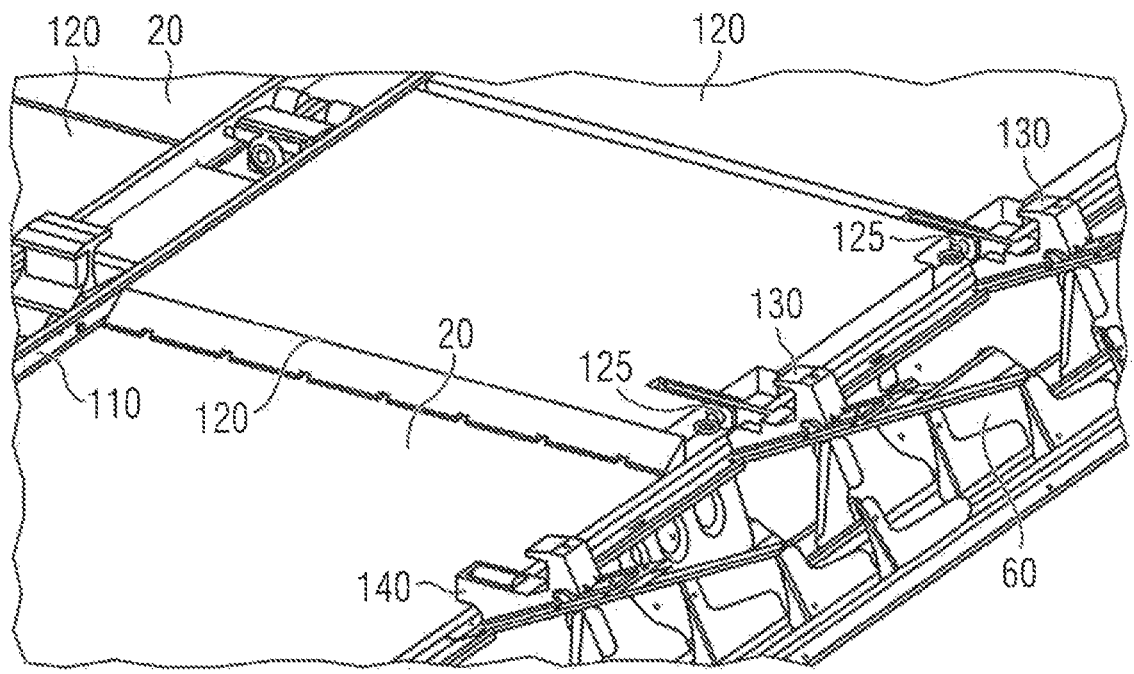
FIG. 8 is a diagrammatic, perspective view of a second and two third floor elements, wherein the second floor element is fixed to a first floor element and to the two third floor elements.
Figure 10:
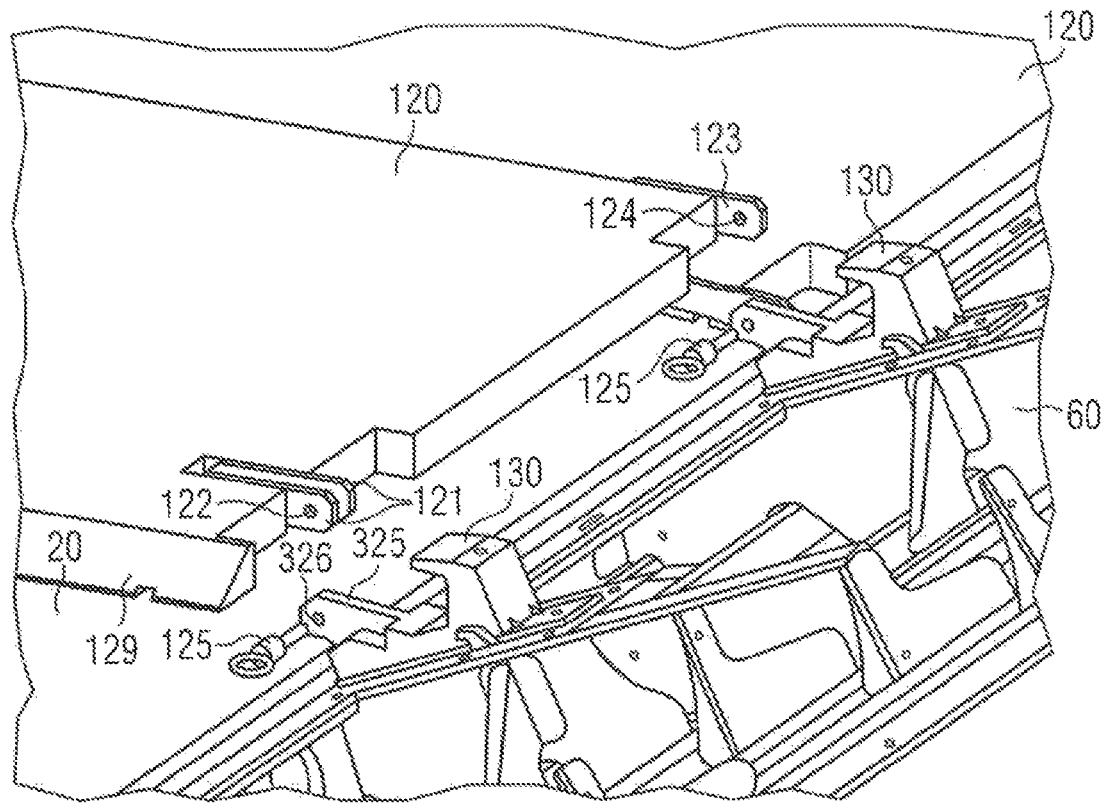
FIG. 10 is a diagrammatic, perspective, detail view of the second floor element from FIG. 8 in a state detached from the two third floor elements.

FIG. 8 is a diagrammatic perspective view of first to fourth floor elements 110 to 140, wherein the second floor element 120 is fixed to a first floor element 110 and to at least one third floor element 130, wherein for fixing to a third floor element 130, a bolt 125 is used as shown in more detail in FIG. 10. The second floor element 120 is shown without balls 1210 in FIG. 8 for greater clarity. The second floor element 120 is arranged on the hold floor 20 but not fixed thereto. Because of the fixing of the second floor element 120 to at least one first floor element 110 and at least one third floor element 130, the second floor element 120 can be installed without connection to the hold floor 20, so that the hold 10 remains gas-tight on removal of the second floor element 120 from the hold 10.

Figure 9:
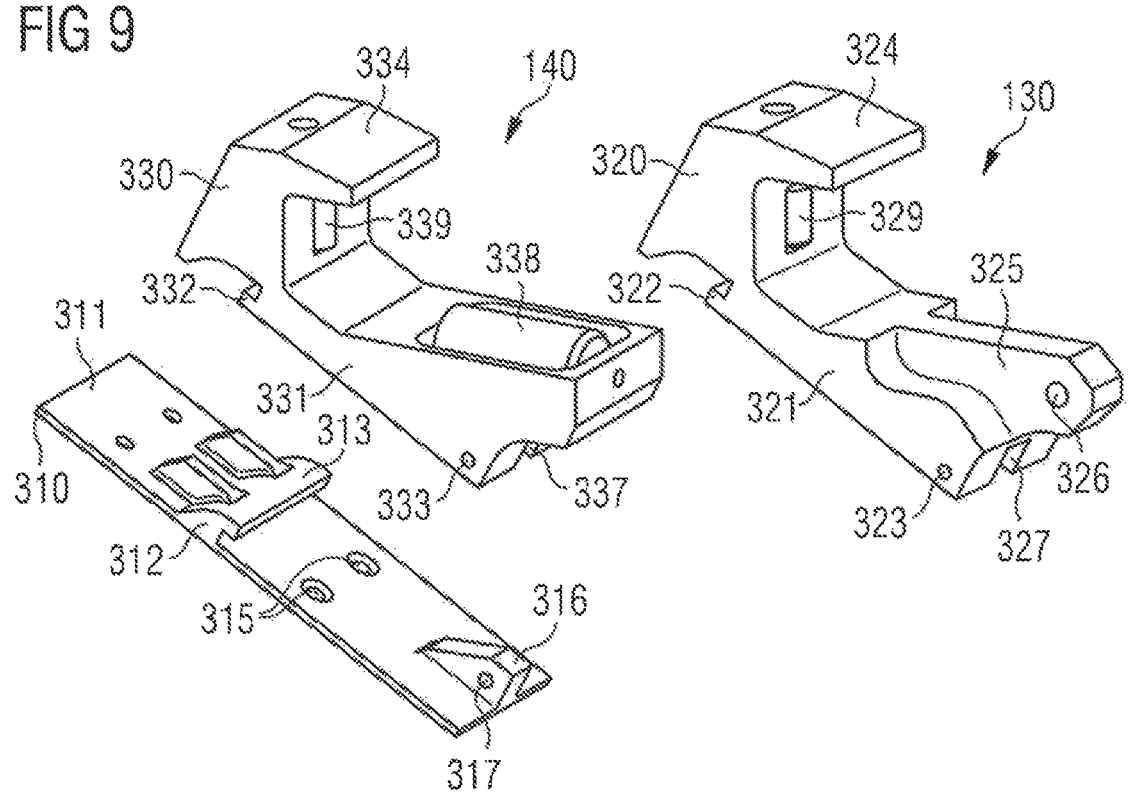
FIG. 9 is a diagrammatic, perspective view of a two-piece third floor element and a second part of a fourth floor element.

FIG. 9 is a diagrammatic, perspective view of a two-piece third floor element 130, and a second part of a fourth floor element 140. The third and fourth floor elements 130, 140 constitute a lock. A first part 310 of the third and fourth floor elements 130, 140 (collectively designated the lock) is configured such that it can be attached fixedly on or in the hold floor 20 and/or a primary structure 60 of the aircraft. The locks 130, 140 are shown in FIG. 9 as attached to the primary structure 60 of the aircraft. For example, the first part 310 of a lock 130, 140 may be fixedly connected to the primary structure 60 and/or the hold floor 20 and/or an element of the sloping surface 35 and/or a hold wall 30 via corresponding openings 315, through which a bolt or other fastener can be guided. The openings 315 may be arranged as usual in conventional cargo hold systems, so that the present cargo hold component system 100 may be fitted to existing aircraft and also used in future aircraft without changes to the primary structure 60.

In the case of connection to the primary structure 60, the first part 310 of a lock 130, 140 is connected, for example at its peripheral edges, gas-tightly to the hold floor 20, for example by a corresponding seal. Similarly, the first part 310 of the lock 130, 140 is connected, for example at its peripheral edges, gas-tightly to the elements of a sloping surface 35 and/or a hold wall 30. Here too, a corresponding seal (not shown) may be used for sealing the hold 10 gas-tightly.

The first part 310 of the lock 130, 140 consists of or comprises a base plate 311 on which a first fixing element 312 is arranged. The first fixing element 312 may consist at least partially of an angled component having a leg 313 which runs spaced apart from and parallel to the base plate 311, and extends at least partially over the width of the base plate 311. A second fixing element 316 is designed in the form of a protrusion. The protrusion 316 has a bore or other opening 317 which runs parallel to the base plate 311.

The second part 320 of the third floor element 130 (lock 130) consists of or comprises a base body 321 which may lie on at least one part of the base plate 311 of the first part 310 of the lock 130. The second part 320 of the lock 130 furthermore has a protrusion 322 which aligns with an underside of the base body 321. The protrusion 322 may also be formed by a corresponding cut-out in the base body 321. The protrusion 322 and/or the associated cut-out in the base body 321 form a counter fixing element for the fixing element 312 of the first part 310 of the lock 130. For example, the cut-out in the base body 321 may have the same or a similar form as the fixing element 312 of the first part 310. The fixing element 312 of the first part 310 and the counter fixing element 322 of the second part 320 of the lock 130 cooperate such that, in a fixed state, a form fit between the fixing element 312 and the counter fixing element 322 prevents a movement of the second part of the lock 130 in at least two directions, for example vertically to and in the longitudinal direction of the base plate 310.

The base body 321 furthermore comprises a further cut-out 327 which has the same or a similar shape as the second fixing element 316 of the first part of the lock 130. Thus the base body 321 of the second part 320 comprises a second counter fixing element corresponding to the second fixing element 316 of the first part 310. Furthermore, the base body 321 has a bore 323 which may for example extend through the entire width of the base body 321.

When the second part 320 of the lock 130 is placed on the first part 310 of the lock 130, so that the first fixing element 312 and first counter fixing element 322 cooperate, the second fixing element 316 may be received in the recess 327. By a bolt or pin or similar fastener which is pushed through the bore 323 of the base body 321 and the now aligned bore 317 of the second fixing element 316 of the first part 310, the second fixing element 316 and the second counter fixing element 327 cooperate such that the movement of the second part of the lock 130 is prevented in at least two directions, for example vertically to the base plate 311 and vertically to the longitudinal direction (width direction) of the base plate 311. By releasing the fastener present in the opening 323 and 317, the counter fixing element 322, 327 of the second part 320 may also be released from the fixing elements 312, 316 of the first part 310.

The second part 320 of the lock 130 furthermore comprises an extension 324 which is designed to guide a cargo container. The extension 324 may be arranged at an angle to the base body 321 so that the extension protrudes into the hold 10 in the height direction (Z direction) and transverse direction (Y direction) of the hold 10. By this overhang, the second part 320 of the lock 130 may engage in (overlap) a corresponding portion of the cargo container, in order to hold and guide the cargo container in the height direction and transverse direction of the hold 10 (Z and Y directions). To transport the cargo container in the longitudinal direction of the hold 10 (X direction), a roller 329 is provided in the extension 324 and can rotate about an axis lying in the height direction of the hold 10 (Z direction).

Finally, the second part 320 of the lock 130 has a protrusion 325 which extends from the base body 321 in the transverse direction of the hold 10 (Y direction). The protrusion 325 furthermore has an opening or bore 326 which runs vertically to the protrusion 325 (in other words, in the longitudinal direction of the hold 10 or X direction). This protrusion 325 with bore 326 forms a further fixing element on which a second floor element 120 may be attached.

The fourth floor element 140 may also consist of or comprise two parts, wherein the first part 310 is structured in the same way as the first part 310 for the third floor element 130. Thus an identically structured element may be used both for the third and the fourth floor elements 130, 140.

The fourth floor element 140 also has a second part 330 which consists of or comprises a base body 331 and an extension 334. Both the base body 331 and the extension 334 may be identical in structure and/or function to the base body 321 and extension 324 of the second part 320 of the third floor element 130. The base body 331 of the second part 330 of the fourth floor element 140 also comprises counter fixing elements 332 and 337 (with bore 333) which cooperate with the fixing elements 312 and 316 of the first part 310, in the same way as the counter fixing elements 322 and 327 of the second part 320 of the third floor element 130.

In contrast to the second part 320 of the third floor element 130, the second part 330 of the fourth floor element 140 has no protrusion, since the fourth floor element 140 is arranged in the hold 10 at the site at which there is no second floor element 120 and hence no need for a fixing element for a second floor element 120. Instead, a roller 338 is provided in the second part 330 of the fourth floor element 140, on which a cargo container can be transported in the longitudinal direction of the hold 10 (X direction). For this, the roller 338 can rotate about an axis which runs parallel to the transverse direction of the hold 10 (Y direction).

A capture or holding device (not shown), for securing loose baggage items (freight items) for bulk loading of the hold 10, may be arranged on the first part 310 of the lock 130, 140. For this, a counter fixing element (not shown explicitly) may be arranged on the first part 310 of the lock 130, 140. The counter fixing element may be arranged on a portion of the first part 310 of the lock 130, 140 which is not covered by the second part 320, 330 of the lock 130, 140 when the second part 320, 330 of the lock 130, 140 is fixed to the first part 310 of the lock 130, 140. For example, the counter fixing element may be arranged at a top left end (in FIG. 9) of the first part 310 of the lock 130, 140. Alternatively, the fixing element 316 of the first part 310 of the lock 130, 140 may also function as a counter fixing element.

In each case, the counter fixing element of the first part 310 of the lock 130, 140 may cooperate with a fixing element (not shown) of the capture or holding device, such that the capture or holding device is held in several directions on the first part 310 of the lock 130, 140. The capture or holding device may thus be attached to the first part of the lock when the second part of the lock has been removed (released).

Furthermore, the extension 324, 334 of the respective second part 320, 330 of the lock 130, 140 may be connected rotatably to the respective base body 321, 331 of the second part 320, 330. For example, the extension 324, 334 may be rotatable about an axis which runs parallel to the longitudinal direction of the hold 10 (X direction). Thus it is possible to compensate for a different orientation of the first part 310 of the lock 130, 140 which may result from a different design of different aircraft types. For example, in different aircraft types, the primary structure 60 may have a different slope at the points at which the locks 130, 140 need be attached.

Alternatively, for each aircraft type, corresponding first parts 310 of the locks 130, 140 may be provided, so that the surface of the base plate 311, on which the respective second part 320, 330 of the locks 130, 140 is fixed, has the same slope in the hold 10 in each aircraft type. Thus the respective second part 320, 330 of the locks 130, 140 may be configured with a fixed extension 324, 334, and only one second part 320, 330 may be used for all aircraft types.

FIG. 10 is a diagrammatic, perspective, detail view of the second floor element 120 from FIG. 8 in a state detached from two third floor elements 130. The two third floor elements 130 are attached, as in FIG. 8, to the primary structure 60 of the aircraft via a respective first part 310. Here, the third floor element 130 is arranged such that the protrusion (fixing element) 325 of the second part 320 of the third floor element 130 lies above the hold floor 20. For example, an underside of the fixing element 325 of the third floor element 130 may be arranged flush with a surface of the hold floor 20.

To fix the second floor element 120 to a third floor element 130, on an outer face (also called a side edge), the second floor element 120 has at least one protruding plate 121 with a bore 122. The protruding plate 121 with the bore 122 forms a counter fixing element which can be attached to the fixing element 325 of the third floor element 130. The second floor element 120 may have a recess in which the at least one protruding plate 121 is arranged. The recess may be dimensioned such that a front edge (an edge furthest away from a side edge of the second floor element 120 in the region of the recess) of the plate 121 aligns with a side edge of the second floor element 120. Furthermore, the recess of the second floor element 120 is dimensioned, in a direction parallel to the side edge of the second floor element 120, such that a bolt, pin or other fastener fits between a plate 121 and the other limits of the recess, so that it can be inserted easily in the opening 122 of the protruding plate 121.

The second floor element 120 may have two protruding plates 121 which are arranged next to each other and together form a counter fixing element. The two protruding plates 121 formed as a fork have a spacing which is at least equal to the width of the fixing element 325 of the third floor element 130. Thus the counter fixing element 121 and the fixing element 325 can be brought into form fit without play as far as possible, and fixed by the fastener 125.

The counter fixing element of the second floor element 120 may also consist of or comprise just a single protruding plate 123 which also has an opening or bore 124. Such a single counter fixing element 123 is suitable for example for fixing the second floor element 120 to a third floor element 130 at a corner of the second floor element 120, so that the second floor element 120 shares the fixing element 325 of the third floor element 130 with a further second floor element 120. In other words, the single protruding plate 123 is fixed on one side of the fixing element 325 of the third floor element 130, while a further single protruding plate 123 of a further second floor element 120 is fixed on the other side of the fixing element 325 of the third floor element 130, and both counter fixing elements 123 of the two adjacent second floor elements 120 share the fixing element 325 of the third floor element 130.

The opening or bore 122, 124 in the protruding plate 121, 123 is arranged such that it can be aligned with the opening or bore 326 of the fixing element 325 of the third floor element 130. In this way, via the opening or bore 122, 124 of at least one protruding plate 121, 123 and a single fastener 125, a secure form fit can be created between the counter fixing element 121, 123 (the at least one protruding plate) of the second floor element 120 and the fixing element 325 of the third floor element 130. In the height direction (Z direction), the protruding plate 121, 123 is dimensioned such that, in the fixed state (or also in a loose form fit without fastener 125) with the fixing element 325, at least one upper edge of the protruding plate 121, 123 does not protrude beyond an upper edge of the fixing element 325, for example lies flush with the upper edge of the fixing element 325. Also, a lower edge of the protruding plate 121, 123 may also lie flush with an underside of the fixing element 325.

The counter fixing element 121 (or 123) of the second floor element 120, configured in this way, cooperates with the fixing element 325 of the third floor element 130 (in cooperation with the fastener 125) such that, in a fixed state, a form fit between the counter fixing element 121 (or 123) and the fixing element 325 prevents a movement of the second floor element 120 (for example, a ball mat) in several directions, for example in the longitudinal, transverse and height directions of the hold 10 (X, Y and Z directions). In a released state (after removal of the fastener 125), the fixing element 325 and the counter fixing element 121, 123 cooperate such that a movement of the second floor element 120 is possible in at least one direction, for example in the height direction of the hold 10 (Z direction). Since the at least one protruding plate 121, 123 furthermore lies against a side of the fixing element 325 of the third floor element 130, initially only a movement in the Z direction is possible until the protruding plate 121, 123 lies above the fixing element 325 and the second floor element 120 can be moved freely.

Figure 11:
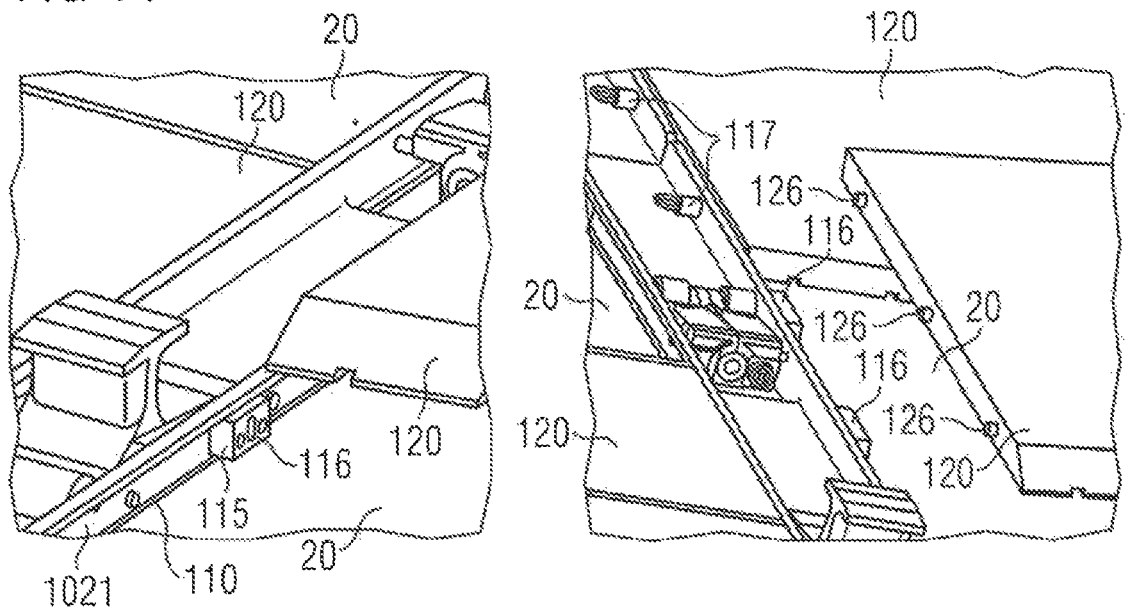
FIG. 11 is diagrammatic, perspective, detail views of the second floor element from FIG. 8 in a state detached from the first floor element.

FIG. 11 is diagrammatic, perspective, detail views of the second floor element 120 from FIG. 8 in a state detached from the first floor element 110. The diagrammatic, detail views shown in FIG. 11 depict a side of the second floor element 120 which lies opposite the side of the second floor element 120 with the counter fixing elements 121, 123.

At least one fixing element 126 is provided on the side of the second floor element 120 opposite the counter fixing elements 121, 123. This fixing element may for example be at least one protrusion 126 protruding from the outer face (side edge) of the second floor element 120.

A component 115, which is arranged on the first floor element 110 and has an opening 116, serves as a counter fixing element. The opening 116 is dimensioned such that it can receive completely (with as little play as possible) the fixing element 126 of the second floor element 120. The at least one fixing element 126 may cooperate with at least one corresponding counter fixing element 115, 116, 1025 such that, in a fixed state, a form fit between the fixing element 126 and the counter fixing element 115, 116, 1025 prevents a movement of the second floor element 120 (for example, a ball mat) in at least two directions, for example in the longitudinal and height directions of the hold 10 (X and Z directions).

If the second floor element 120 is fixed on the opposite side via the counter fixing elements 121, 123, the second floor element 120 is fixed completely (in the X, Y and Z directions). Only when the counter fixing element 121, 123 is in a released state can the fixing element 126 of the second floor element 120 also be moved in at least one direction, for example in the transverse direction of the hold 10 (Y direction), in order to be guided out of the openings 116, 1025 of the respective counter fixing element 115, 116, 1025. Then (after complete extraction of the fixing element 126 from the respective opening 116, 1025) the fixing element 126 is in a released state, wherein a movement of the second floor element 120 is possible in at least one direction, for example in the height direction of the hold 10 (Z direction). Thus the second floor element 120 can be removed.

Alternatively, an opening 1025 (FIG. 5) may be provided directly in a side wall of the trough-like component 1021 as a counter fixing element, in which the fixing element 126 of the second floor element 120 may be introduced. This prevents a protruding element 115 on the side of the first floor element 110 from obstructing the handling or mounting of the first floor element 110, or prevents the element 115 from interfering with a part of the hold floor 20.

A further optional connection possibility for the fixing element 126 is that the fixing element 126 is dimensioned such that it reaches through an opening 1025 in the trough-like component 1021. In addition, at least at one end of the fixing element 126, a thread may be arranged on which a counter fixing element 170 may be screwed. In this way, the fixing element 126 in the opening 1025 may cooperate with the counter fixing element 117 such that, in a fixed state, a form fit between the fixing element 126 and the counter fixing element 117 (and the opening 1025 in the trough-like component 1021) prevents a movement of the second floor element 120 in three directions (X, Y and Z directions). Because of the counter fixing element 117, the second floor element 120 is held on both sides in the transverse direction of the hold (Y direction) (by the counter fixing element 117 on the one side and the fastener 125 on the other side). In this way, a statically uncertain state is achieved, which however cause a greater stiffness of the entire cargo hold component system 100, in particular in the region in front of/next to the hold opening 40.

Figure 12:
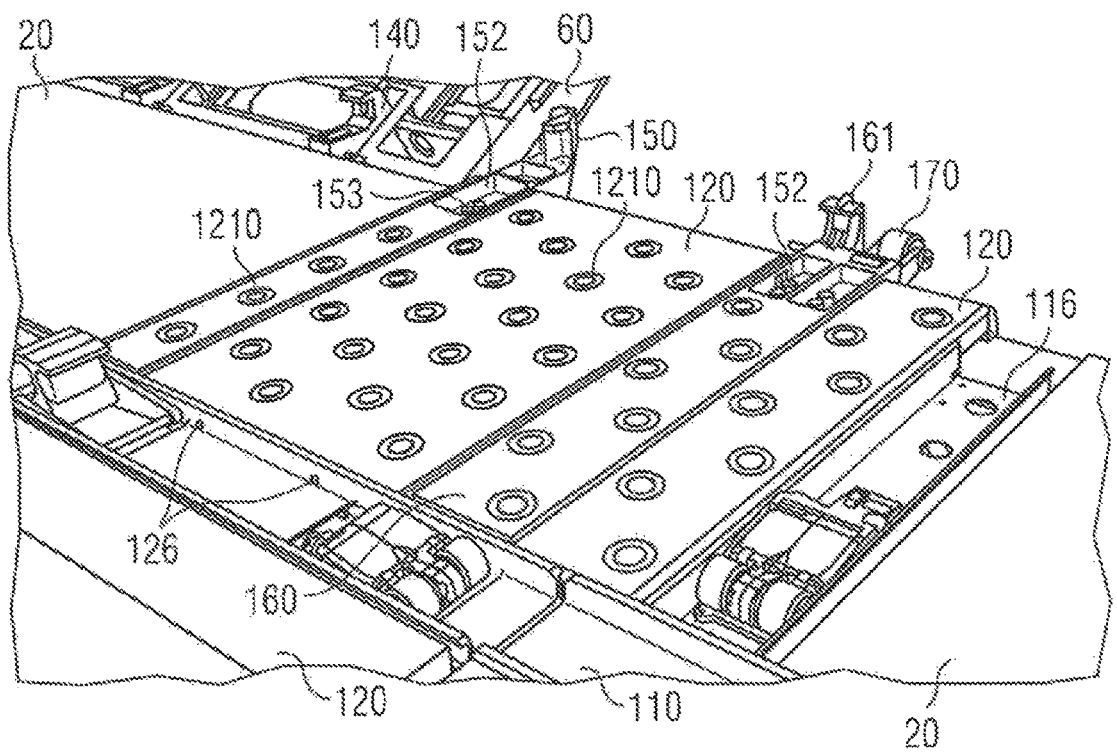
FIG. 12 is a diagrammatic, perspective view of a fifth and a sixth floor element in a fixed state.

FIG. 12 is a diagrammatic, perspective view of a fifth floor element 150 and sixth floor element 160 in a fixed state. The fifth and sixth floor element 150, 160 is arranged on the hold floor 20 at the hold opening 40 and serves to receive/load cargo containers in the hold 10, and to unload cargo containers from the hold 10.

The fifth floor element 150, like the second floor element 120, comprises at least one fixing element 126 in order to be fixed to the first floor element 110. The fixing element 126 formed as a protrusion is fixed in a corresponding opening 116, 1025 of the counter fixing element, which is arranged on or in the first floor element 110 in the same way as described in relation to FIG. 11. Fixing elements 126 are visible in FIG. 12 only on the intermediate second floor element 120, but are also arranged similarly and with the same action principle on the fifth and sixth floor elements 150, 160.

Figure 13:
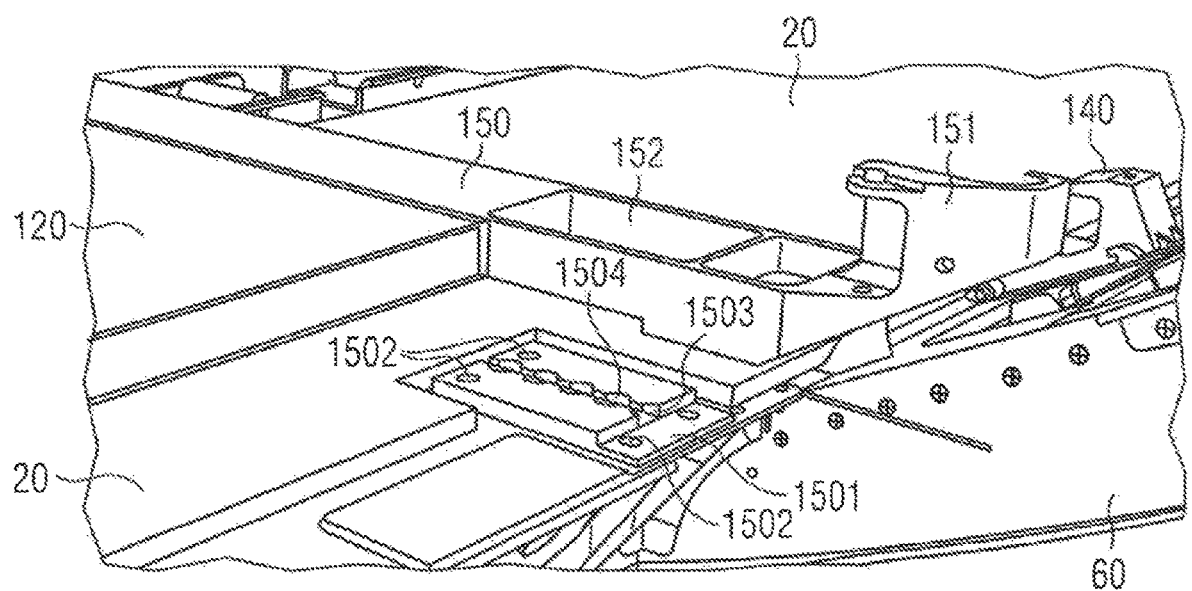
FIG. 13 is a diagrammatic, perspective, detail view of the fifth floor element from FIG. 12 in a detached state.

FIG. 13 is a diagrammatic, perspective, detail view of the fifth floor element 150 from FIG. 12 in a detached state. The fifth floor element 150 is configured as an inlet guide which can be fixed releasably at a fixing site in the region of the loading opening 40 of the hold 10 (hold opening). The fifth floor element 150 may comprise an inlet guide 151 (may be configured integrally with inlet guide 151). Alternatively, an inlet guide 151 may be attached to the fifth floor element 150. The inlet guide 151 protects the primary structure 60 at the hold opening 40 from damage from cargo containers during loading and unloading. Furthermore, the fifth floor element 150 may contain balls 1210 to facilitate movement of a cargo container in the hold 10.

A second floor element 120 may be connected to the fifth floor element 150 on a long side. Alternatively, a second floor element 120 may be configured integrally (as one piece) with the fifth floor element 150. The second floor element 120 or the portion of the integrally configured fifth floor element 150 may also be fixed to the first floor element 110 via fixing elements 126.

Figure 14:
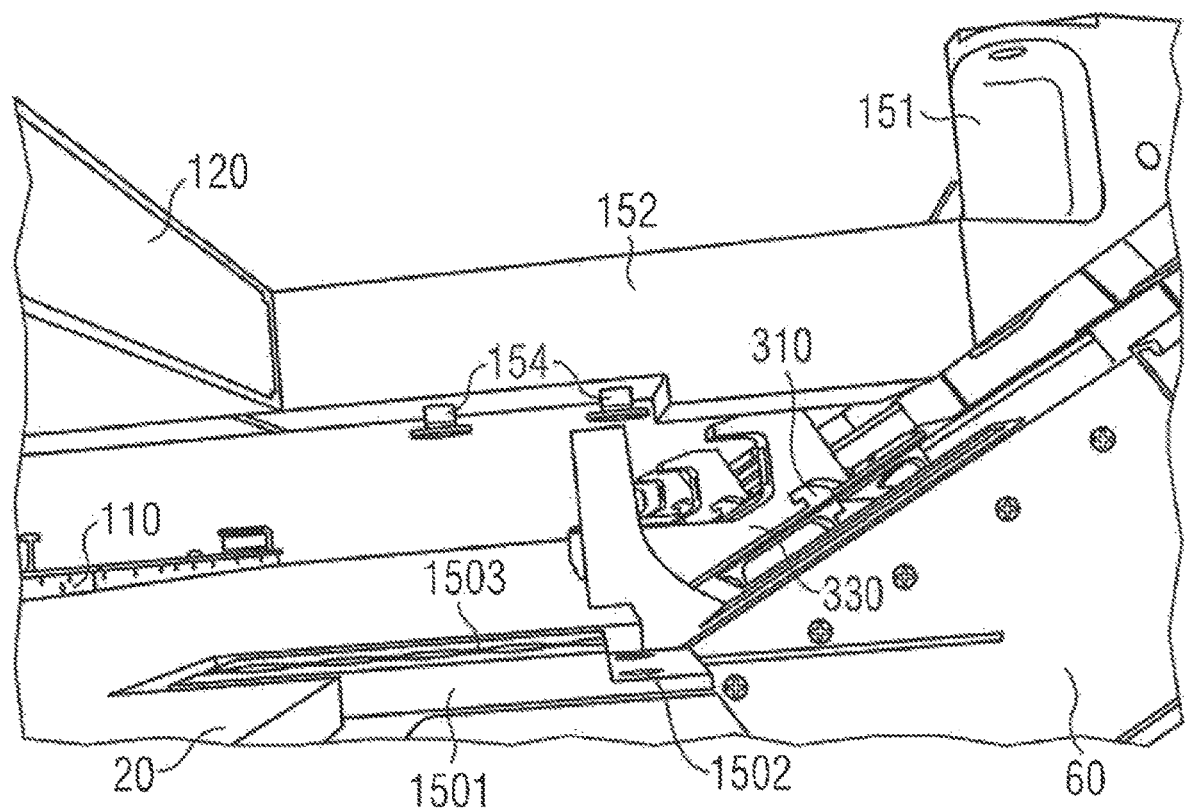
FIG. 14 is a diagrammatic, perspective, detail view of several fixing elements of the fifth floor element from FIG. 12 in a detached state.

The fifth floor element 150 furthermore comprises a fixing element 152 for releasable fixing of the fifth floor element 150 at a fixing site close to the hold opening 40. The fixing element 152 furthermore comprises at least one first fixing component 153, which may for example be configured as a nut or cap nut. Furthermore, the fixing element 152 as shown in FIG. 14 comprises, on the underside of the fifth floor element 150, an undercut protrusion 154 which is configured to engage in a counter fixing element 1501 (for example a guide rail) which can be attached fixedly in the hold 10.

The fixable counter fixing element 1501 consists of or comprises a base body or a base plate 1501 with openings 1502 through which bolts or other fasteners (not shown) may be guided, in order to connect the counter fixing element 1501 to the primary structure 60 of the aircraft or to the hold floor 20, and create a fixing site for the fifth floor element 150. In FIGS. 13 and 14, the counter fixing element 1501 is shown as connected to the primary structure 60 of the aircraft, wherein the hold floor 20 runs against a peripheral outer edge of the counter fixing element 1501 and is connected gas-tightly via a seal (not shown) to the counter fixing element 1501 and seals the hold 10 gas-tightly.

The fixable counter fixing element 1501 furthermore comprises a guide rail 1503. The guide rail 1503 is arranged in the transverse direction of the hold 10 (Y direction) and on its upper side has alternate protrusions and cut-outs 1504. The cut-outs 1504 are dimensioned such that an undercut protrusion 154 of the fifth floor element 150 may be guided through these and inserted in the guide rail 1503. Subsequent movement of the fifth floor element 150 with the undercut protrusion 154 in the transverse direction of the hold 10 (Y direction) causes the undercut protrusion 150 to move down and between two protrusions next to the cut-out 1504. For example, the distance between the centers of a cut-out 1504 and an adjacent protrusion may be such that it corresponds to a length of the fixing element 126 on the opposite side of the fifth floor element 150. In this way, after complete insertion of the fixing element 126 in the corresponding counter fixing element 116, 1025 of the first floor element 110, the fifth floor element 150 abuts the floor element 110 and, at the same time, with the undercut protrusion 154, may be arranged centrally on a protrusion of the guide rail 1503.

By actuation of the fixing component 153, for example by turning the nut or cap nut on a thread of the undercut protrusion 154, the undercut protrusion 154 is raised (moved in the Z direction). Thus the undercut protrusion 154 may be clamped to the protrusions next to the cut-out 1504.

Thus the undercut protrusion 154 of the fixing element 152 may engage in the guide rail 1503 such that, in a fixed state, a form fit between the fixing element 152 and the guide rail 1503 acting as a counter fixing element prevents a movement of the fifth floor element 150 in at least one direction, for example in the transverse or height direction of the hold 10 (Y or Z direction). Evidently, the guide rail 1503 prevents a movement of the fifth floor element 150 also in the longitudinal direction of the hold 10 (X direction). Clamping of the undercut protrusion 154 to the guide rail 1503 prevents the movement in the transverse direction of the hold (Y direction) by friction forces.

In this way, the fifth floor element 150 and any integrated or attached second floor element 120 can be fixed on the one side by fixing elements 126 to at least one first floor element 110 (this constitutes a first fixing site). On the opposite side lying next to the hold opening 40, the fifth floor element 150 (and also a second floor element 120) is fixed via a fixing element 152 at a second fixing site of the counter fixing element 1501, whereby detachment of the fifth (and second) floor element 150 (120) at the first fixing site of the at least one fixing element 126 is prevented.

FIG. 12 furthermore shows a sixth floor element 160 which may be configured as a loading hatch lock 161 or comprise a loading hatch lock 161. The structure of the sixth floor element 160 substantially corresponds to the structure of the fifth floor element 150, with the exception that the sixth floor element 160 is arranged in a central region of the hold opening 40, and therefore has a loading hatch lock 161 instead of an inlet guide 151. Additionally or alternatively, a braking roller 170 may be arranged on a side of the sixth floor element 160 facing the hold opening 40. This prevents a cargo container from rolling back or rolling out of the hold opening 40.

The sixth floor element 160, like the fifth floor element 150, may also comprise balls 1210. Also, a second floor element 120 may be attached to the sixth floor element 160 or formed integrally (as one piece) therewith. The sixth floor element 160, and also the attached second floor element 120)

is fixed on one side via fixing elements 126 (not shown in FIG. 12) to a first floor element 110.

On the opposite side facing the hold opening 40, at least one fixing element 152 is provided which can be fixed to a corresponding counter fixing element 1501, for example a guide rail 1503, in order to fix the sixth floor element 160 (and also the connected second for element 120) in three directions (X, Y and Z directions). The fixing element 152 and counter fixing element 1501 are identical in structure and function to the fixing element 152 and counter fixing element 1501 described in relation to the fifth floor element 150.

The counter fixing element 1501, and in particular the guide rail 1503, may be implemented by a seat rail known from a passenger cabin. Thus to fix the fifth and sixth floor element 150, 160, low-cost components from another region of aircraft construction may be used.

FIG. 12 also shows a first floor element 110 which runs in the transverse direction of the aircraft (Y direction). A drive component for cargo containers may be integrated therein, which is configured to move a cargo container, for example via an electrically driven roller or ball, in the region of the hold 10 in front of the hold opening 40. Alternatively or additionally, this first floor element 110 may also have a securing device for a cargo container, which prevents the cargo container from falling out of the hold opening 40.

It is understood that the exemplary embodiments presented above are not limitative and do not restrict the object disclosed herein. In particular, it is evident to the person skilled in the art that the described features may be combined with each other arbitrarily, and/or various features omitted without deviating from the object disclosed herein.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A cargo hold component system for a cargo hold of an aircraft, the cargo hold component system comprising:
   a plurality of floor elements for transporting and securing cargo in the cargo hold; and
   a plurality of fixing elements;
   wherein the floor elements are at least partially releasably fixable by the fixing elements to fixing sites on or in a cargo hold floor, such that, when fixed to the fixing sites, the floor elements support a loading of the cargo hold with cargo containers and, when a first group of the floor elements is removed from the fixing sites by release of the fixing elements and a second group of the floor elements is partially removed from the fixing sites by release of the fixing elements, the cargo hold is configured for sealing in a gas-tight manner.

2. The cargo hold component system according to claim 1, wherein at least one of the floor elements is configured as part of a roller conveyor, which is fixable in a longitudinal direction of the cargo hold and on which the cargo containers are movable.

3. The cargo hold component system according to claim 2, wherein the roller conveyor is formed multipiece, and wherein a first part of the roller conveyor is fixedly attachable on or in the cargo hold floor and a second part of the roller conveyor is releasably fixable to the first part.

4. The cargo hold component system according to claim 2, wherein the roller conveyor has a counter fixing element configured to cooperate with one of the fixing elements such that, in a fixed state, the fixing element and the counter fixing element are form fit together to prevent movement of the roller conveyor in at least two directions.

5. The cargo hold component system according to claim 4, wherein the counter fixing element is configured to cooperate with one of the fixing elements such that, in a fixed state, the fixing element and the counter fixing element are form fit together to prevent movement of the roller conveyor in at least a longitudinal direction and a height direction of the cargo hold and, in a released state, at least one part of the roller conveyor is movable in at least one direction of the cargo hold.

6. The cargo hold component system according to claim 5, wherein the at least one direction is the longitudinal direction of the cargo hold.

7. The cargo hold component system according to claim 1, wherein at least one of the floor elements is a ball mat that is releasably fixable at one of the fixing sites, which is in a region of a loading opening of the cargo hold.

8. The cargo hold component system according to claim 7, wherein the ball mat comprises, on an outer face, at least one of the fixing elements, which comprises at least one protrusion that protrudes from the outer face and is configured to cooperate with at least one counter fixing element, which comprises an associated opening, of a roller conveyor that is fixable in the longitudinal direction of the cargo hold, such that, in a fixed state, the fixing element and the counter fixing element are form fit together to prevent movement of the ball mat in at least a longitudinal direction and a height direction of the cargo hold and, in a released state, the ball mat is movable in at least the height direction of the cargo hold.

9. The cargo hold component system according to claim 7, wherein the ball mat comprises, on an outer face, a counter fixing element configured to cooperate with one of the fixing elements at an associated lock, such that, in a fixed state, the one of the fixing elements and the counter fixing element are form fit together to prevent movement of the ball mat in longitudinal, transverse, and height directions of the cargo hold and, in a released state, the ball mat is movable in at least the height direction of the cargo hold.

10. The cargo hold component system according to claim 1, wherein one or more of the floor elements is a loading hatch lock and/or an inlet guide, which is/are each releasably fixable at one of the fixing sites, which is in a region of a loading opening of the cargo hold.

11. The cargo hold component system according to claim 10, wherein the one or more of the floor elements each comprise, on at least one outer face, at least one of the fixing elements, which comprises a protrusion that protrudes from the at least one outer face and is configured to cooperate with a counter fixing element, which comprises an associated opening, of a roller conveyor that is fixable in the longitudinal direction of the cargo hold, such that, in a fixed state, the fixing element and the counter fixing element are form fit together to prevent movement of the one or more of the floor elements in at least a longitudinal direction and a height direction of the cargo hold and, in a released state, the one or more of the floor elements are movable in at least the height direction of the cargo hold.

12. The cargo hold component system according to claim 10, wherein the one or more of the floor elements each comprise, on an underside, an undercut protrusion configured to engage in a guide rail that is firmly fixable in the cargo hold, such that, in a fixed state, the undercut protrusion and the guide rail are form fit together to prevent movement of the one or more of the floor elements in at least a transverse direction or a height direction of the cargo hold and, in a released state, the one or more of the floor elements are movable in at least the transverse direction of the cargo hold.

13. The cargo hold component system according to claim 10, wherein the loading hatch lock and/or the inlet guide is/are each fixedly connected to, or formed integrally with, a ball mat.

14. The cargo hold component system according to claim 1, wherein at least one of the floor elements is configured as a two-piece lock.

15. The cargo hold component system according to claim 14, wherein a first part of the two-piece lock is fixedly attachable to the cargo hold floor or to a primary structure of the aircraft and a second part of the two-piece lock is releasably fixable to the first part.

16. The cargo hold component system according to claim 14, wherein:

the two-piece lock comprises a protrusion configured to cooperate with a counter fixing element of one of the floor elements such that, in a fixed state, the protrusion and the counter fixing element are form fit together to prevent a movement of the one of the floor elements in longitudinal, transverse and height directions of the cargo hold and, in a released state, the one of the floor elements is movable in at least the height direction of the cargo hold, and/or the two-piece lock comprises at least one roller, which supports loading and unloading of the cargo hold with cargo containers.

17. An aircraft with a cargo hold component system, the cargo hold component system comprising:

a plurality of floor elements for transporting and securing cargo in the cargo hold; and a plurality of fixing elements;

wherein the floor elements are at least partially releasably fixable by the fixing elements to fixing sites on or in a cargo hold floor, such that, when fixed to the fixing sites, the floor elements support a loading of the cargo hold with cargo containers and, when a first group of the floor elements is removed from the fixing sites by release of the fixing elements and a second group of the floor elements is partially removed from the fixing sites by release of the fixing elements, the cargo hold is configured for sealing in a gas-tight manner.

* * * * *